(12) United States Patent
Wehrs et al.

(10) Patent No.: US 8,448,525 B2
(45) Date of Patent: May 28, 2013

(54) DIFFERENTIAL PRESSURE BASED FLOW MEASUREMENT

(75) Inventors: David L. Wehrs, Eden Prairie, MN (US); John P. Miller, Eden Prairie, MN (US); Andrew J. Klosinski, Waconia, MN (US)

(73) Assignee: Rosemount Inc., Eden Prairie, MN (US)

( * ) Notice: Subject to any disclaimer, the term of this patent is extended or adjusted under 35 U.S.C. 154(b) by 187 days.

(21) Appl. No.: 13/039,698

(22) Filed: Mar. 3, 2011

(65) Prior Publication Data

US 2012/0222494 A1    Sep. 6, 2012

(51) Int. Cl.
*G01F 1/37* (2006.01)

(52) U.S. Cl.
USPC ..................................................... 73/861.52

(58) Field of Classification Search
USPC ................ 73/861.52, 861.63, 861.64; 702/50
See application file for complete search history.

(56) References Cited

U.S. PATENT DOCUMENTS

| | | | | |
|---|---|---|---|---|
| 6,332,111 | B1 * | 12/2001 | Fincke | 702/50 |
| 6,463,810 | B1 * | 10/2002 | Liu | 73/861.63 |
| 7,233,745 | B2 * | 6/2007 | Loechner | 398/128 |
| 2010/0191481 | A1 * | 7/2010 | Steven | 702/47 |

FOREIGN PATENT DOCUMENTS

WO    WO 2008/025935    3/2008

OTHER PUBLICATIONS

"Diagnostic System for Venturi Meters" by R. Steven, *15th International Flow Measurement Conference 2010*, Jan. 1, 2011, pp. 1-20.
Search Report and Written Opinion from PCT/US2012/026260, dated Jun. 28, 2012.
"Diagnostic Methololgies for Generic Differntial Pressure Flow Meters", by R. Steven, *26th International North Sea Flow Mesurement Workshop*, Oct. 2008, pp. 1-30.
Chinese Office Action from Chinese Application No. CN201120371932.9, dated Feb. 24, 2012.
Steven, Richard; "Significantly Improved Capabilities of DP Meter Diagnostic Methodologies"; Windsor, CO; 29 pages.

* cited by examiner

*Primary Examiner* — Jewel V Thompson
(74) *Attorney, Agent, or Firm* — Westman, Champlin & Kelly, P.A.

(57) ABSTRACT

A system for measuring flow of process fluid through process piping in an industrial process includes a flow restriction element in the process pipe. A first differential pressure transmitter is configured to measure a first differential pressure across the flow restriction element in response to flow of process fluid. A second differential pressure transmitter configured to measure a second differential pressure in the process fluid across the flow restriction element. Circuitry performs diagnostics based upon the first differential pressure and the second differential pressure.

25 Claims, 3 Drawing Sheets

DIFFERENTIAL PRESSURE BASED FLOW MEASUREMENT

BACKGROUND OF THE INVENTION

The present invention relates to industrial process control or monitoring systems. More specifically, the present invention relates to systems which measure flow of process fluid in an industrial process.

Many industrial processes use or operate upon various types of fluids. During operation of the process, the fluids may be transferred through process piping from one location to another. In many instances, it is desirable to monitor the flow of such fluid through the process piping. The monitoring can be used for measurement purposes alone, or can be used in a control system. For example, a valve can be controlled based upon the amount of flow of process fluid which is measured.

Process variable transmitters are used to measure process variables of industrial processes. One such process variable is flow of process fluid is discussed above. Various techniques can be used to measure such flow. One such technique measures flow based upon a differential pressure developed across a restriction element placed in the process piping. The differential pressure can be measured by a differential pressure transmitter and used to calculate the flow of process fluid. The restriction element placed in the flow causes various pressures to be developed as described in WO2008/025935 entitled "IMPROVEMENTS IN OR RELATING TO FLOW METERING", by Richard Steven having an international filing date of Aug. 29, 2006.

SUMMARY

A system for measuring flow of process fluid through process piping in an industrial process includes a flow restriction element in the process pipe. A first differential pressure transmitter is configured to measure a first pressure drop across the flow restriction element in response to flow of process fluid. A second differential pressure transmitter configured to measure a second differential pressure in the process fluid across the flow restriction element. Circuitry performs diagnostics based upon the first differential pressure and the second differential pressure.

DETAILED DESCRIPTION

The present invention relates to measurement of flow through process piping based upon a differential pressure created across a restriction element placed in the process piping.

As discussed in more detail below, the restriction element creates a number of different differential pressures. One differential pressure, referred to as a "traditional" differential pressure ($\Delta P_t$), is the differential pressure measured directly across the restriction element. A recovery pressure ($\Delta P_r$) is a differential pressure created between a minimum pressure at the restriction element and a maximum downstream pressure. The permanent pressure loss ($\Delta P_{PPL}$) is a differential pressure measured from upstream of the restriction element and a location downstream where the pressure has fully recovered.

In a traditional differential flow measurement application, a differential pressure transmitter is installed across a primary element (a restriction element such as an orifice plate, a conditioning orifice, a Venturi or V-cone, etc.). The flow rate of the process fluid is proportional to the square root of the traditional differential pressure ($\Delta P_t$). Additionally, the temperature and absolute pressure may be measured to dynamically calculate the density of the process fluid. The calculated density can be used to compensate mass flow measurements based upon changes in the process fluid density.

Various diagnostic techniques have been implemented in differential process variable transmitters. Many techniques related to differential process flow measurement are based upon monitoring statistical variations in detected pressure in order to identify problems associated with the "impulse lines" which couple the differential pressure transmitter to the process fluid. For example, if one or both of the impulse lines become plugged, a change in the standard deviation of the differential pressure signal may be detected. However, accurate detection of a plugged impulse line is also often dependent upon other factors such as flow rate, the orifice plate Beta ratio, the amount of gas trapped in the impulse line and others.

Figure 1A:
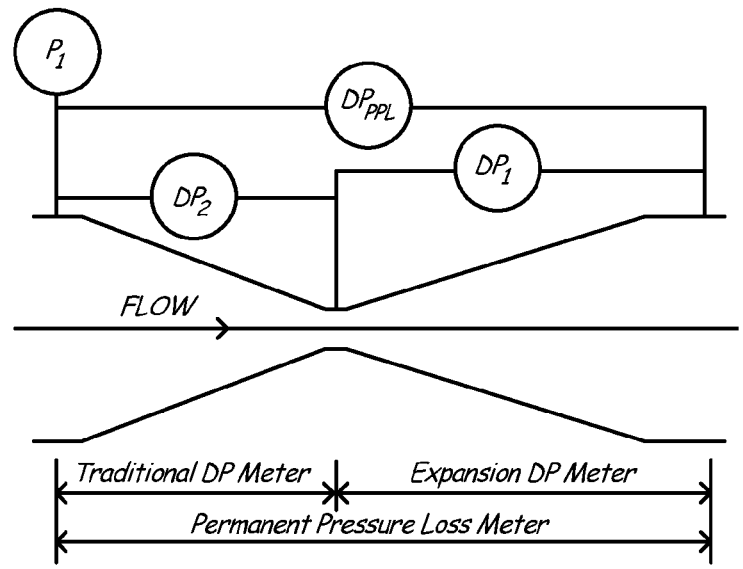
FIG. 1A is a simplified schematic view of a flow tube having a restriction and the resulting pressure differentials.
Figure 1B:
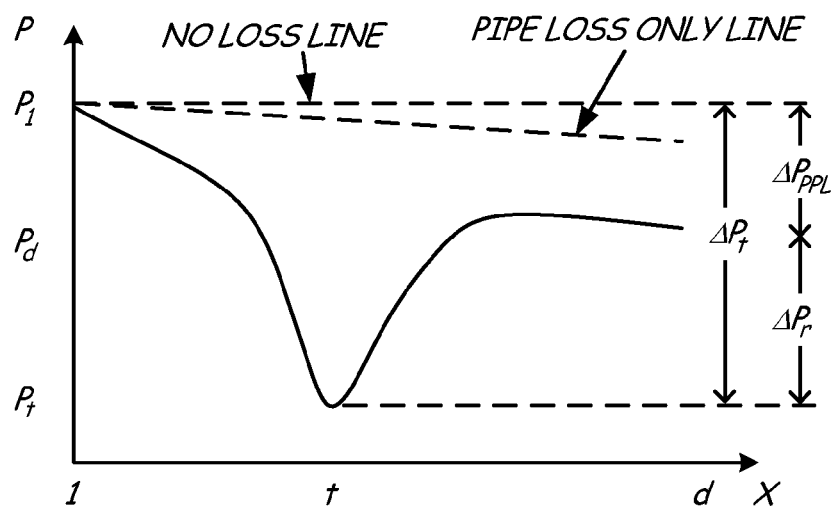
FIG. 1B is a graph of pressure versus position for the configuration illustrated in FIG. 1A.

As discussed in WO2008/025935 entitled "IMPROVEMENTS IN OR RELATING TO FLOW METERING", by Richard Steven having an international filing date of Aug. 29, 2006, as well as Diagnostic Methodology for Generic Differential Pressure Flow meters, presented at the 26$^{th}$ International North Sea Measurement Workshop, Oct. 21-24, 2008, a "primary element" creates a number of differential pressures in a flowing process fluid. Three unique differential pressure measurements available include: the traditional pressure drop ($\Delta P_t$), the recovered pressure ($\Delta P_r$), and the permanent pressure loss ($\Delta P_{PPL}$). FIGS. 1A and 1B show three differential pressures created by flow post due to a primary element illustrated in a cross sectional view of process piping (FIG. 1A) and a graphical view of pressure versus position along the process piping (FIG. 1B). Although, the primary element is shown to be a Venturi tube, the methods discussed herein can be applied to any primary element.

As graphically illustrated in FIG. 1B, if any two of the differential pressures are known, the third differential pressure can be calculated based upon the following relationship:

$$\Delta P_t = \Delta P_r + \Delta P_{PPL} \qquad \text{Equation 1}$$

The mass flow rate of the fluid can be calculated using any one of these three DP measurements, as follows:

$$\dot{m}_t = EA_t K \sqrt{2\rho \cdot \Delta P_t} \qquad \text{Equation 2}$$

$$\dot{m}_r = EA_t K_r \sqrt{2\rho \cdot \Delta P_r} \qquad \text{Equation 3}$$

$$\dot{m}_{PPL} = A_t K_{PPL} \sqrt{2\rho \cdot \Delta P_{PPL}} \qquad \text{Equation 4}$$

where:
E=Velocity of departure $$(E = \frac{1}{\sqrt{1-\beta^4}}$$

where β is the ratio of the cross-sectional-area of the throat to the cross-sectional-area of the pipe)
$A_t$=Cross-sectional-area of throat $A_j$=Cross-sectional area of pipe
K=Traditional flow meter coefficient
$K_r$=Expansion flow coefficient
$K_{PPL}$=PPL flow coefficient
ρ=density of fluid $\Delta P_t$, $\Delta P_{PPL}$ and $\Delta P_r$ are all related and can be used to accurately measure flow of the process fluid. It is known that during normal operation, the mass flow calculated from each of these differential pressure measurements should be approximately equal, within any measurement of uncertainty. However, if there is something abnormal in the process, then the three mass flow readings will differ significantly from one another. It is known that by monitoring the three mass flow calculations, such a difference can be identified, within a defined threshold, and used to provide diagnostics which indicate some type of problem or failure in the system. It has been described that such differences can be used to detect plugged pressure ports, incorrect differential pressure transmitter readings, buckled or worn orifice plates or a partial blocking of a primary element. Such diagnostics are not capable of determining the exact source of the failure.

Figure 2:
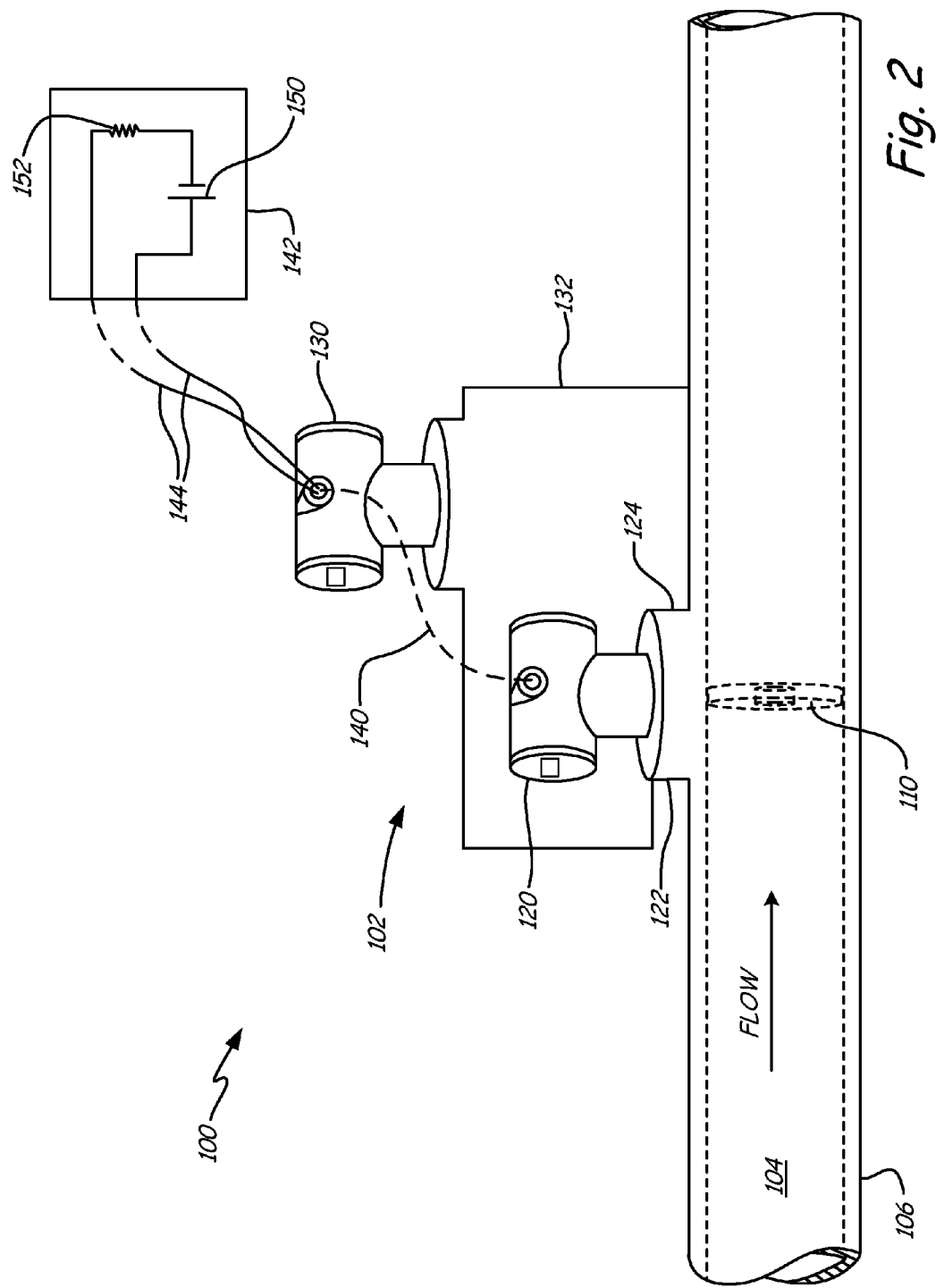
FIG. 2 is a diagram showing two differential pressure transmitter coupled to process piping.

FIG. 2 is a simplified diagram of an industrial process 100 including a system 102 for measuring flow of a process fluid 104 through process piping 106. System 102 includes an orifice plate 110 carried in pipe 106 which obstructs the flow of process fluid 104. A first (or traditional) differential pressure transmitter couples to the pipe 106 through impulse piping 122 and 124. The first pressure transmitter 120 is configured to measure $\Delta P_t$ as described above. A second differential pressure transmitter 130 is arranged to measure the permanent pressure loss ($\Delta P_{PPL}$) and couples to process piping 106 through impulse piping 122 and 132. In the embodiment shown in FIG. 2, transmitters 120 and 130 are illustrated in communication through a local databus 140 and transmitter 130 couples to a control room 142 through a two wire process control loop 144. The two wire process control loop 144 can be configured to power transmitter 130 and/or 120 as well as carry information. Example two wire process control loops include process control loops which operate in accordance with the HART® communication protocol or other protocols such as FieldBus protocols. In such configurations, the control room 142 can be modeled as a power source 150 and an electrical resistance 152. Other types of process control loops include wireless communication loops in which data is shared wirelessly between field devices and/or a central location such as control room 142. In such configurations, neither transmitter 120 or 130 connects to a control loop 144. In other configurations, one or both of the transmitters 120, 122 connect to a control loop 144, either through a wired or wireless connection. The local data connection 140 may itself comprise a process control loop, or may comprise other types of data communication connections, such as, a control area network (CAN) databus, digital communication based databuses, or other techniques and may be a wired or wireless connection.

Figure 3:
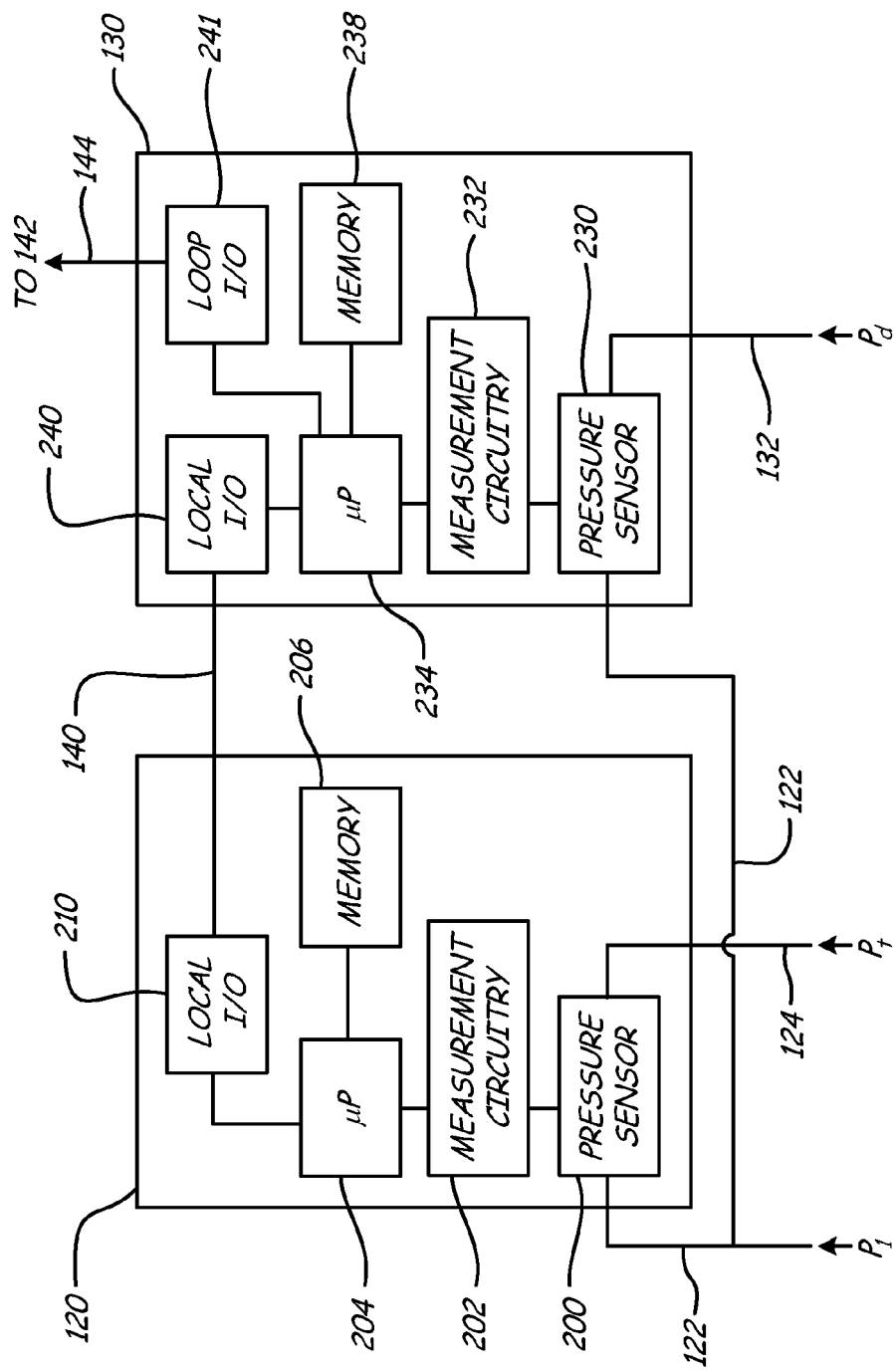
FIG. 3 is a simplified block diagram showing pressure transmitters of FIG. 2.

FIG. 3 is a simplified block diagram which illustrates differential pressure transmitters 120 and 130. As shown in FIG. 3, differential pressure transmitter 120 couples to pressure $P_1$ (see FIG. 1A) through impulse piping 122 and to pressure $P_t$ through impulse piping 124. A differential pressure sensor 200 couples to impulse piping 122 and 124 and is configured to provide an input to measurement circuitry 202 related to a pressure difference $P_1$ and $P_t$. The pressure sensor 200 can be in accordance with any appropriate sensing technology and may be formed by more than one pressure sensor. The measurement circuitry 202 provides an output to a microprocessor (or microcontroller) 204 indicative of the measured differential pressure (ΔP). Microprocessor 204 operates in accordance with instructions stored in a memory 206 and couples to local input/output circuitry 210. As discussed above, the local I/O circuitry 210 can be in accordance with any technology and is configured to communicate with the second differential pressure transmitter 130. This communication is over local databus 140. The second differential pressure transmitter 130 is illustrated including largely similar components. A differential pressure sensor 230 couples to impulse piping 122 and 132 to measure the differential pressure between $P_1$ and $P_d$ (see FIG. 1A). Differential pressure sensor 230 couples to measurement circuitry 232 which provides a differential pressure output to a microprocessor (or microcontroller) 234. Microprocessor 234 operates in accordance with instructions stored in a memory 238 and communicates with first process differential pressure variable transmitter 120 using local input/output circuitry 240. Additionally, second differential transmitter 130 includes loop input/output circuitry 241 for use in communicating over process control loop 144. This communication may be with a process control room 142 or with other field devices and may be wired or wireless.

The configurations illustrated in FIGS. 2 and 3 are for illustrative purposes only. For example, two differential pressure transmitters may communicate using other means or configurations. The communication may be only to a central room, such as control room 142, or can be between other field devices. The communication may be wired or wireless, or any combination. In a completely wireless combination, the local connection 140 may be formed using wireless communication protocol such as mesh network. Similarly, communication link 140 may comprise a wired process control loop.

Three different differential pressure measurement at the primary element have been used ($\Delta P_t$, $\Delta P_r$ and $\Delta P_{PPL}$) as discussed above. This can be used for three different mass flow calculations, ($\dot{m}_t$, $\dot{m}_r$ and $\dot{m}_{PPL}$). However, as the differential pressure measurements are related as:

$$\Delta P_t = \Delta P_r + \Delta P_{PPL} \quad \text{Equation 5}$$

only two measurements are required and the third differential pressure may be calculated and used to perform diagnostics. As discussed in the prior art, if either an inlet pressure or throat pressure is low, the different mass flow calculations are no longer equal but instead will follow the relationship:

$$\dot{m}_{PPL} < \dot{m}_t < \dot{m}_r \quad \text{Equation 6}$$

However, with the present invention, only two mass flow calculations, such as $\dot{m}_{PPL}$ and $\dot{m}_t$, are required in order to diagnose the same problem. A third mass flow calculation is not required. Similar diagnostics can be performed in order to detect other failures including drifting differential pressure measurements, a damaged orifice plate, a partially obstructed primary element, etc.

The diagnostics can be performed locally within either differential pressure transmitter 120 or 130, or in a separate field device or centralized location such as control room 142. In such a configuration, the pressure measurements must be provided to other process equipment where the diagnostics are performed.

As discussed in the prior art, a pressure loss ratio (PLR) is defined and used to provide diagnostics. The PRL is as follows:

$$PLR = \frac{\Delta P_{PPL}}{\Delta P_t} \quad \text{Equation 7}$$

By defining the constants:

$$\alpha_t = E^2 A_t^2 K^2 \quad \text{Equation 8}$$

$$\alpha_{PPL} = A_i^2 K_{PPL}^2 \quad \text{Equation 9}$$

The two mass-flow equations can be re-written in parabolic form as:

$$\dot{m}_t^2 = \alpha_t \cdot \Delta P_t \quad \text{Equation 10}$$

$$\dot{m}_{PPL}^2 = \alpha_{PPL} \cdot \Delta P_{PPL} \quad \text{Equation 11}$$

During normal flow conditions, $\dot{m}_t = \dot{m}_{PPL}$. Thus, the PLR can be written as:

$$PLR = \frac{\Delta P_{PPL}}{\Delta P_t} = \frac{\alpha_t}{\alpha_{PPL}} = PLR_0 \quad \text{Equation 12}$$

This can be used to diagnose a problem in the system, for example, assume a problem in the flow system exists and $\dot{m}_t > \dot{m}_{PPL}$. This yields:

$$\dot{m}_t^2 > \dot{m}_{PPL}^2 \quad \text{Equation 13}$$

$$\alpha_t \cdot \Delta P_t > \alpha_{PPL} \cdot \Delta P_{PPL} \quad \text{Equation 14}$$

$$PLR = \frac{\Delta P_{PPL}}{\Delta P_t} < \frac{\alpha_t}{\alpha_{PPL}} \quad \text{Equation 15}$$

If the PLR value is defined as $PLR_1$ when $\dot{m}_t > \dot{m}_{PPL}$, this yields:

$$PLR_1 < \frac{\alpha_t}{\alpha_{PPL}} = PLR_0 \quad \text{Equation 16}$$

Thus, it is evident that a change in the mass flow readings such that $\dot{m}_t > \dot{m}_{PPL}$ can be detected by a decrease by the pressure loss ratio (PLR).

Similarly, if there is a problem in the flow systems such that $\dot{m}_t < \dot{m}_{PPL}$, this yields:

$$PLR = \frac{\Delta P_{PPL}}{\Delta P_t} < \frac{\alpha_t}{\alpha_{PPL}} \quad \text{Equation 17}$$

If this PLR value is defined as $PLR_2$, it can be seen that:

$$PLR_2 > PLR_0 \quad \text{Equation 18}$$

Thus, a change in the mass flow readings such at $\dot{m}_t > \dot{m}_{PPL}$ can be detected by an increase in the calculated pressure loss ratio.

In accordance with the present invention, the use of two differential pressure measurements from the same primary element to detect various problems in the flow system is possible. Mass flow calculations are not necessary for the diagnostics. With the present invention, the pressure loss ratio can be calculated and monitored over time. Variations over time (trends) of the pressure loss ratio can be monitored and used to identify a failed or failing component. During normal operation, the pressure loss ratio remains approximately constant. However, if there is problem with the system, the pressure loss ratio will tend to increase or decrease. This can be used to perform diagnostics and, advantageously does not require complete mass flow calculations to be performed. Such mass flow calculations require calibrations to identify the flow coefficients such as K and $K_{PPL}$.

If a field device, such as transmitters 120 or 130, has the pressure loss ratio available, there are several different ways that this value can be monitored for diagnosing a problem with the flow system. For example, the PLR value can be made available using a digital transmission such as in accordance with the HART® digital communication protocol through either a wired or wireless connection. The PLR value can also be calculated directly by a transmitter. The PLR value can be monitored and any trending observed using appropriate techniques such as digital transmission values, wireless communication techniques, adapters, gateways, etc. Trend values can be observed during normal operating conditions and used to create high and/or low threshold alarm limits. If the PLR exceeds these limits, an alarm can be provided to an operator or other equipment. In another example, a microprocessor or other device can "learn" PLR values during normal operation. This can be done internally to a particular transmitter or by an external device. When in the learning mode, the field device can identify a baseline value for the pressure loss ratio. Through the learning process, thresholds can be determined either automatically or through user configuration. For example, a value of three times the standard deviation of a PLR value during a learning phase can be set as an alarm threshold. Once the baseline PLR and threshold values are established, a transmitter or other device can enter a normal monitoring mode. If the PLR goes outside of one of the thresholds, an alert can be triggered and provided to a host system or other device.

The information sent to other field devices or central location can be any of the directly measured values or may comprise a calculated value. For example, individual pressure measurements from transmitters 120 and 130 can be provided as well as calculated values such as $\dot{m}_t, \dot{m}_{PPL}$, the pressure loss ratio as well as the warning alarm.

A local data link can be used to provide data communications between the first and second differential pressure transmitters so that one pressure transmitter may provide differential pressure information to the second differential pressure transmitter. This can be in accordance with any communication techniques. In one specific example, the local databus comprises CAN (Control Area Network).

The present invention can be implemented using other types of field devices and other communication protocols than those specifically discussed herein. For example, the configuration can be implemented using a Foundation Fieldbus communication protocol. In such an implementation, both the $\Delta P_t$ and $\Delta P_{PPL}$ transmitter can be positioned on the same Fieldbus communication segment. One transmitter can be configured to receive the measurement from the other transmitter, for example, an AI block, an AO block and a link. With the additional information, the pressure loss ratio can be calculated. The calculated PLR can then be communicated to a host system or used internally by a field device such as in a learning mode during normal operation of the process. If the device detects that the PLR has exceeded the threshold, a field device alert can be provided to a host system. Other communication protocols may also be used. In a wireless, mesh network type configuration, one transmitter may be configured to monitor the transmission from the other transmitter in order to calculate the pressure loss ratio.

Although the present invention has been described with reference to preferred embodiments, workers skilled in the art will recognize that changes may be made in form and detail without departing from the spirit and scope of the invention.

What is claimed is:

1. A system for measuring flow of process fluid past a flow restriction element positioned in process piping in an industrial process comprising:
    a first differential pressure transmitter configured to measure a first differential pressure in the process fluid due to flow of process fluid past the flow restriction element;
    a second differential pressure transmitter configured to measure a second differential pressure in the process fluid due to flow of process fluid past the flow restriction element; and
    circuitry configured to perform diagnostics based upon the first and the second differential pressures;
    wherein the diagnostics are based upon comparison of a parameter calculated from the first and second differential pressures with a threshold.

2. The system of claim 1 wherein the first differential pressure comprises a traditional differential pressure $\Delta P_t$ and the second differential pressure comprises a permanent pressure loss $\Delta P_{PPL}$.

3. The system of claim 1 wherein the diagnostics are determined based upon a pressure loss ratio.

4. The system of claim 1 including a data link between the first differential pressure transmitter and the second transmitter.

5. The system of claim 1 wherein the circuitry is located in the first differential pressure transmitter.

6. The system of claim 1 wherein at least one of the first and second differential pressure transmitters is in communication with a central location.

7. The system of claim 6 wherein the circuitry is located at the central location.

8. The system of claim 6 wherein the communication is provided on a process control loop.

9. The system of claim 8 wherein the process control loop comprises a wired process control loop.

10. The system of claim 8 wherein the process control loop comprises a wireless process control loop.

11. The system of claim 1 wherein the first and second pressure transmitters are in communication on a wireless communication link.

12. The system of claim 1 wherein the first differential pressure comprises a differential pressure selected from the group of differential pressures consisting of traditional differential pressure $\Delta P_t$, recovery pressure $\Delta P_r$ and permanent pressure loss $\Delta P_{PPL}$.

13. The system of claim 1 wherein the diagnostics are based upon observing a trend in changes of a parameter calculated based upon the first and second differential pressures.

14. The system of claim 1 wherein the circuitry is configured to operate in a learning mode.

15. The system of claim 1 wherein the first differential pressure transmitter is further configured to calculate flow of the process fluid.

16. The system of claim 15 wherein the flow is communicated to a central location over a process control loop.

17. A method of performing diagnostics in a flow measurement system configured to measure flow of process fluid past a flow restriction element carried in process piping in an industrial process, in the method comprising:
    measuring a first differential pressure across the flow restriction element using a first differential pressure transmitter;
    measuring a second differential pressure across the restriction element using a second differential pressure transmitter;
    diagnosing operation of the flow measurement system using a parameter calculated from the measured first differential pressure and the measured second differential pressure;
    wherein the diagnostics are based upon comparison of a parameter calculated from the first and second differential pressures with a threshold.

18. The method of claim 17 wherein the first and second differential pressures are selected from the group of differential pressures consisting of traditional differential pressure $\Delta P_t$, recovery pressure $\Delta P_r$ and permanent pressure loss $\Delta P_{PPL}$.

19. The method of claim 17 wherein the first differential pressure comprises a traditional differential pressure $\Delta P_t$ and the second differential pressure comprises permanent pressure loss $\Delta P_{PPL}$.

20. The method of claim 17 wherein the diagnostics are determined based upon a pressure loss ratio.

21. The method of claim 17 including communicating on a data link between the first differential pressure transmitter and the second transmitter.

22. The method of claim 17 wherein at least one of the first and second differential pressure transmitters is in communication with a central location.

23. The method of claim 17 including communicating between the first and second pressure transmitters over a wireless communication link.

24. The method of claim 17 wherein the first differential pressure comprises a differential pressure selected from the group of differential pressures consisting of traditional differential pressure $\Delta P_t$, recovery pressure $\Delta P_r$ and permanent pressure loss $\Delta P_{PPL}$.

25. The method of claim 17 including observing a trend in changes of the parameter calculated based upon the first and second differential pressures.

* * * * *